Nov. 14, 1933.  W. B. HEINZ  1,935,445
VELOCITY MEASURING APPARATUS
Filed Feb. 25, 1932
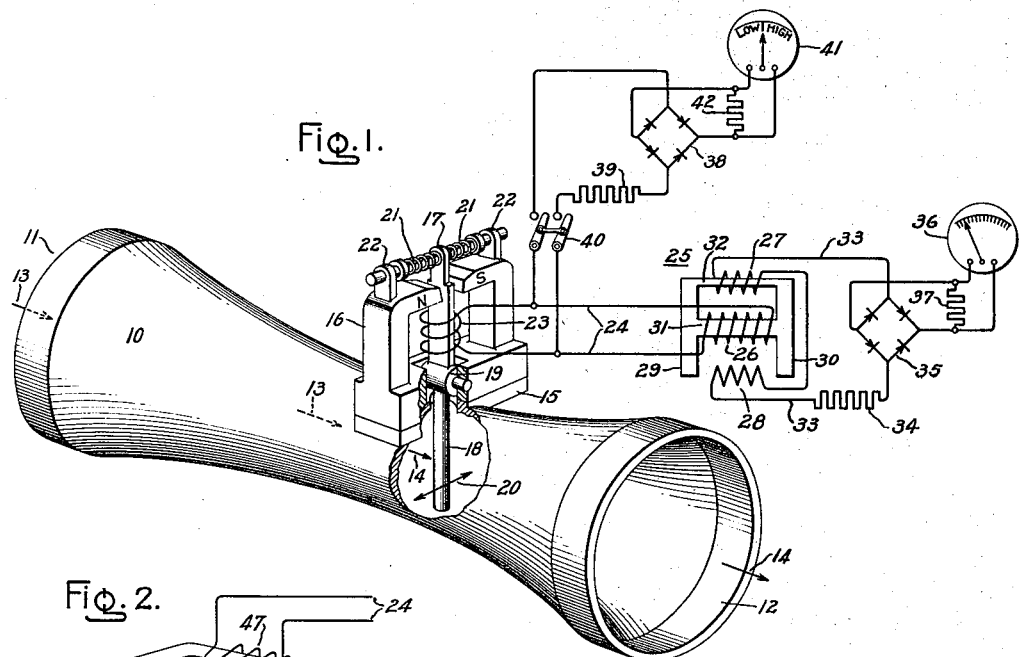
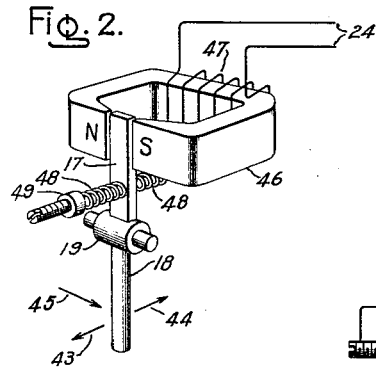
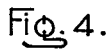
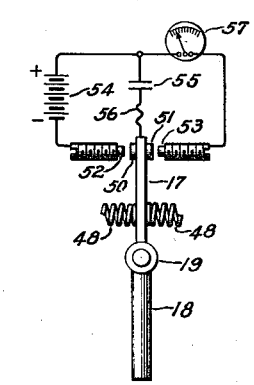
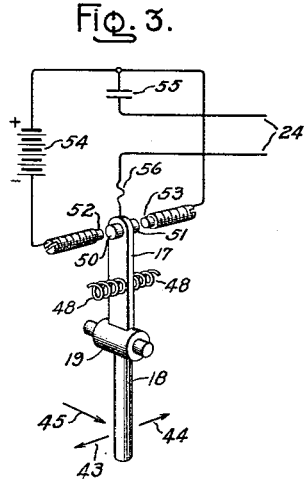
Inventor:
Winfield B. Heinz,
by Charles E. Tullar
His Attorney.

Patented Nov. 14, 1933

1,935,445

UNITED STATES PATENT OFFICE 1,935,445

VELOCITY MEASURING APPARATUS

Winfield B. Heinz, Scotia, N. Y., assignor to General Electric Company, a corporation of New York Application February 25, 1932. Serial No. 595,019

20 Claims. (Cl. 73—167)

My invention relates to velocity measuring apparatus, and the principal object of my invention is to provide apparatus for measuring the relative velocity between any two relatively moving bodies, one of which is a fluid.

It is well known to those skilled in the art of hydrodynamics that when an element having a curved surface, such as a cylinder, moves at a sufficiently rapid rate through a fluid, or when a fluid moves at a sufficiently rapid rate past an element having a curved surface, a system of vortices in the fluid is produced on each side of the curved surface of the element. These vortices are caused by the so-called boundary layers of the fluid, i. e., those layers of the fluid which come into proximity with the surface of the element. The fluid elements constituting these boundary layers exhibit a rotational movement after coming into contact with the curved surface of the element, and this rotational movement produces the vortices. An excellent description of the cause of these vortices is given in an article entitled "The Generation of Vortices in Fluids of Small Viscosity", this article being a published lecture delivered by Dr. L. Prandtl on May 16, 1927, before the Royal Aeronautical Society, London, England.

Many types of devices are employed for measuring the relative velocity between two relatively moving bodies, one of which is fluid. So far as I know, the indications of practically all the commonly used devices are considerably affected by changes in the density of the fluid body. Thus, if a commonly used device is employed for indicating the velocity of a fluid passing through a pipe, the device will indicate accurately the velocity only when the fluid has the particular density at which the device was calibrated, and if the density of the fluid changes because of temperature variations, or other reasons, then the indications of the device will change also. Similarly, if a commonly used device is employed for indicating the velocity of an airplane relative to the body of air through which it is passing, the device will accurately indicate the velocity only when the air has the particular density at which the device was calibrated, and if the density of the air changes because of temperature or barometric variations, or because of a change in the altitude of the airplane, then the indications of the device will change also. It is obvious that the inaccuracies in the velocity indications of commonly used devices due to variations in density of the fluid body is a serious disadvantage. It, therefore, became desirable to provide a device which would accurately indicate the velocity, irrespective of variations in the density of the fluid.

My invention provides this desired type of device. The underlying principle of my invention consists of producing the previously described vortices of the fluid body in response to a relative motion between a solid body and a fluid body and then utilizing in a novel manner a force produced by these vortices. To produce these vortices, I provide a movable element suspended in the fluid body from the solid body so that the motion of the movable element is in a plane which is at an angle to the line along which the moving body travels. This movable element may have any kind of a curved surface, and may be suitably suspended from the solid body in any manner, but I prefer to employ a cylinder pivoted in the solid body so that the motion of the cylinder is in a plane which is normally perpendicular to the line along which the moving body travels. The vortices produced at the curved surface of the cylinder alternately detach themselves from each side of the cylinder, and thus cause a pulsating force on the cylinder at a right angle to the line along which the moving body travels. This pulsating force, therefore, causes vibration of the cylinder in a plane which is perpendicular to the line along which the moving body travels. The frequency of the vibration of the cylinder is substantially directly proportional to the relative velocity between the solid and fluid bodies, and is substantially independent of variations in the density of the fluid body. This is the pulsating force that causes the well known "Aeolian tone" which is heard when a wind blows over wires or through trees.

Any means that are operatively associated with the cylinder and that are adapted to be influenced by its vibration may be employed for indicating or recording the relative velocity between the solid and fluid bodies. I prefer to employ an electrical instrument connected to electroresponsive means which are operatively associated with the cylinder and which are adapted to be so influenced by its vibration as to circulate through the instrument a current whose average magnitude is substantially directly proportional to the frequency of the vibration of the cylinder. It follows that the indications of the instrument are substantially directly proportional to the relative velocity between the solid and fluid bodies, and are substantially independent of the density of the fluid body.

When it is desirable to increase the power available for vibrating the cylinder, I provide, as an additional feature of my invention, a member having a passage for the fluid, this passage including a portion whose area is smaller than the area of other portions, a well known form of this member being a Venturi tube, which I preferably employ. The Venturi tube is secured to the solid body and the cylinder is pivoted in the solid body or in the Venturi tube, so that an arm of the cylinder projects into the Venturi tube at or near its throat. Due to the well-known action of a Venturi tube, the relative velocity between the cylinder and the fluid body at or near the Venturi tube throat is higher than the relative velocity between the solid body and the fluid body outside the Venturi tube, thus increasing the power available for vibrating the cylinder above what would be available if the cylinder were suspended directly into the fluid body without a Venturi tube. The relative velocity between the cylinder and the fluid body at or near the Venturi tube throat is substantially directly proportional to the relative velocity beween the solid body and the fluid body outside the Venturi tube. It follows that the indications of the electrical instrument are substantially directly proportional to the relative velocity between the solid body and the fluid body outside the Venturi tube and are substantially independent of the density of the fluid body.

Having described the underlying principle of my invention, I will now describe, in connection with the accompanying drawing, several preferred embodiments of my invention by which the same may be carried out in practice. The features of my invention which I believe to be novel and patentable are pointed out in the appended claims.

Fig. 1 of the drawing represents a view, partly in perspective and partly in front elevation, of a preferred embodiment of my invention with part of the apparatus broken away, so as to illustrate more clearly the construction thereof. In this figure, I show a pivoted member consisting of a magnetic armature and a cylinder which projects into a Venturi tube near its throat, the armature being located between two poles of a magnet. A coil surrounds the armature, and two electroresponsive indicating means are energized by the coil, one being energized directly from the coil and the other being energized from the secondary windings of a transformer whose primary winding is energized by the coil. Fig. 2 represents an embodiment in which the coil surrounds the magnet, and the latter with its armature is arranged differently from that shown in Fig. 1. Fig. 3 represents an embodiment in which the pivoted cylinder vibrates a contact member which alternately effects the charging and discharging of a condenser connected in series with the primary winding of the transformer shown in Fig. 1. Fig. 4 represents an embodiment in which the pivoted cylinder vibrates a contact member which alternately connects and disconnects a direct current source to and from the primary winding of the transformer shown in Fig. 1. Fig. 5 represents an embodiment in which the pivoted cylinder vibrates a contact member which alternately effects the charging of a condenser and the discharge thereof through an indicating instrument. Similar parts in the different figures are represented by the same reference characters.

As previously mentioned, my invention may be employed for measuring the relative velocity between any two relatively moving bodies, one of which is a fluid; hence, the apparatus invented by me is not illustrated as associated with any specific type of relatively moving bodies whose relative velocity it is desired to measure. However, at present I believe that the measurement of the velocity of an airplane relative to the body of air through which it is passing is the most important practical application of my invention, and, therefore, my invention will be described in connection with this use; but I want it clearly understood that my invention is not limited to such use.

Referring to Fig. 1, 10 represents a Venturi tube having circular openings 11 and 12. Tube 10 will be so secured to the airplane that a line passing through the centers of openings 11 and 12 will be parallel to the line along which the airplane travels and will point in the direction of this travel. It is clear that a stream of air flows through tube 10 when the airplane is flying. I will assume that the airplane is flying so that the direction of the stream of air flowing through tube 10 is represented by full and dotted arrows 13 and 14, respectively. Attached to or integral with tube 10 is a bracket 15 to which is secured a magnet 16 having two spaced apart poles represented by N and S, respectively. Magnet 16 is preferably made of cobalt steel, if it be a permanent magnet. Projecting into the space between poles N and S is an armature 17 made of magnetic material, and projecting into tube 10 at or near its throat is a cylinder 18. Armature 17 and cylinder 18 are integral with or secured to a hub 19, which is so pivoted in the lower part of magnet 16 that the motion of cylinder 18 is in a direction which is represented by a double pointed arrow 20. The plane of this motion is substantially perpendicular to a line passing through the centers of openings 11 and 12. It is, therefore, obvious that the motion of cylinder 18 is substantially perpendicular to the line along which the airplane travels. Armature 17 is so secured to hub 19 that the motion of cylinder 18 in one direction moves the armature towards the N pole, whereas the motion of cylinder 18 in the opposite direction moves the armature towards the S pole. Compression springs 21 are placed between the top end of armature 17 and brackets 22 secured to magnet 16, these springs exerting substantially equal pressure on opposite sides of the armature, so that the latter tends to assume a position which is substantially central between poles N and S. A coil 23 surrounds armature 17, as shown in the drawing, this coil being connected to leads 24.

When armature 17 is substantially central between poles N and S, there is substantially no flux passing through the armature, because the magnetomotive forces of poles N and S at the armature are equal, and the N pole tends to send a flux downward through the armature whereas the S pole tends to send a flux upward through the armature. When armature 17 is moved from its central position towards the N pole, the magnetomotive force of the latter overcomes the magnetomotive force of the S pole and, therefore, sends a flux downward through the armature, whereas when the armature is moved from its central position towards the S pole the magnetomotive force of the latter overcomes the magnetomotive force of the N pole and, therefore, sends a flux upward through the armature. The magnitude of the flux passing downward or upward through armature 17 depends on the amount it is moved from its central position towards poles N and S, respectively. It should, therefore, be obvious that if armature 17 is vibrated between poles N and S with movement of the armature to both sides of its central position, the armature will be threaded by an alternating magnetic flux which will rise from zero to maximum in one direction, decrease to zero and rise to maximum in the opposite direction, decrease to zero again, etc. This will cause an alternating voltage to be induced in coil 23, which voltage will be impressed on leads 24. The magnitude of this voltage will be substantially directly proportional to the amplitude and frequency of the vibration of armature 17, and the frequency of this voltage will be equal to the frequency of the vibration of the armature. When the airplane is flying, the stream of air passing through tube 10 produces vortices in the air at the surface of cylinder 18, and, for reasons described near the beginning of the specification, this causes vibration of the cylinder in the direction represented by the double pointed arrow 20. The frequency of the vibration of cylinder 18, and consequently of armature 17, is substantially directly proportional to the speed of the airplane relative to the body of air through which it is passing, and is substantially independent of the density of this air, whereas the amplitude of the vibration of the cylinder, and consequently of the armature, is dependent upon both the speed of the airplane relative to the body of air through which it is passing and the density of this air. It follows that the frequency of the voltage induced in coil 23 and impressed on leads 24 is substantially directly proportional to the speed of the airplane relative to the body of air through which it is passing, and is substantially independent of the density of this air, whereas the magnitude of this voltage is responsive to both the speed of the airplane relative to the body of air through which it is passing and the density of this air.

In order to obtain a record or a visual indication of the speed of the airplane relative to the body of air through which it is passing, the voltage between leads 24 should be impressed on some electroresponsive means that will give indications which are substantially directly proportional to the frequency of this voltage, and which are substantially independent of the magnitude of this voltage within the range of speeds to be indicated. Any suitable electroresponsive means possessing these characteristics may be employed, and I therefore want it clearly understood that my invention is not limited to the electroresponsive means which I illustrate. These electroresponsive means are illustrated and described in detail in United States Patent No. 1,835,969, Rohner, December 8, 1931, assigned to the assignees of this application, and, therefore, in my application I give only a brief description of the structure and operation of these means. These electroresponsive means comprise a transformer 25 having a primary winding 26 and two secondary windings 27 and 28. The core of transformer 25 has two spaced apart legs 29 and 30. Legs 29 and 30 are joined at their centers by a leg 31 which is proportioned not to become saturated during the range of speeds to be indicated. Legs 29 and 30 are joined at one end by a leg 32 which is proportioned to become saturated during the range of speeds to be indicated. Leg 31 is surrounded by primary winding 26, which is connected to leads 24, and leg 32 is surrounded by secondary winding 27. Secondary winding 28 is placed in the air gap between the unbridged ends of legs 29 and 30. The two secondary windings are connected in series so that their voltages oppose, and, therefore, the voltage across leads 33 will be the difference between the voltages induced in the two secondary windings. Leads 33 are connected in series with a high resistance 34 to a suitable full wave rectifier 35. A direct current milli-voltmeter 36 is connected to rectifier 35, and a resistance 37 is connected across the milli-voltmeter. Resistances 34 and 37 have a slightly negative temperature coefficient of resistance so as to compensate for changes in impedance of other elements in the circuit due to variations in air temperature. By suitably proportioning the dimensions of leg 32 and secondary windings 27 and 28, the average magnitude of the current flowing through milli-voltmeter 36 is substantially directly proportional to the frequency of the voltage impressed on primary winding 26, and is substantially independent of the magnitude of this voltage within the range of speeds to be indicated. It is, therefore, obvious that by suitably calibrating and marking the scale of milli-voltmeter 36 in speed units, the milli-voltmeter gives substantially accurate indications of the speed of the airplane relative to the body of air through which it is passing, irrespective of changes in the density of this air.

It is frequently desirable to have on the instrument panel of an airplane an instrument which will indicate to the pilot whether or not the airplane is flying sufficiently fast to sustain itself safely in the air. Such an instrument can be termed a "sustentation indicator", and it is an additional object of my invention to provide such an indicator. The sustaining force of an airplane is substantialy directly proportional to the square of the velocity of the airplane relative to the body of air through which it is passing, and is substantially directly proportional to the density of this air. In order for an instrument to function as a "sustentation indicator", its indications must be responsive to the velocity of the airplane relative to the body of air through which it is passing and the density of this air; hence it should be clear that any suitable electrical instrument energized in response to the magnitude of the voltage impressed on leads 24 will answer the purpose, because the magnitude of this voltage is responsive both to the speed of the airplane and the density of the air. I, therefore, want it clearly understood that my invention is not limited to the indicating apparatus which I illustrate. This apparatus consists of a suitable full wave rectifier 38 connected in series with a high resistance 39, both of which may be connected to lines 24 by closing a switch 40. A direct current milli-voltmeter 41 is connected to rectifier 38, and a resistance 42 is connected across the milli-voltmeter. Resistances 39 and 42 have a slightly negative temperature coefficient of resistance so as to compensate for changes in impedance of other elements in the circuit due to variations of air temperature.

One method of using milli-voltmeter 41 as a "sustentation indicator" is as follows: With the airplane flying through air of the greatest density expected, which is normally the case when the airplane is flying at the lowest altitude expected, and with the airplane flying at the lowest velocity relative to this air that is sufficient for the airplane to sustain itself safely in the air, the amplitude and frequency of vibration of cylinder 18 is such as to result in impressing on leads 24 a voltage of a certain magnitude, for example .5 volts. With .5 volts impressed on leads 24, the milli-voltmeter 41 is calibrated so that its pointer is at the heavy line shown at the center of its scale. If the airplane enters a low density region while flying at the altitude where milli-voltmeter 41 was calibrated, or if the airplane rises to a higher altitude and consequently enters a lower density air body, then the airplane should fly at a higher velocity to sustain itself safely in the air, and this fact will be indicated by milli-voltmeter 41, since its pointer will move to the left of the heavy line shown on its scale and will thus be over that portion of its scale marked "Low". The reason for this movement of the pointer is that the decreased density of the air decreases the amplitude of the vibration of cylinder 18, thus decreasing the magnitude of the voltage induced in coil 23, hence decreasing the voltage impressed on milli-voltmeter 41. The pilot will thus become aware that the airplane is flying too slow to sustain itself safely in the air, and will increase the speed of the airplane so that the pointer of milli-voltmeter 41 again is at the heavy line on its scale. Since the sustaining force of the airplane is substantially directly proportional to the square of the airplane speed, therefore the airplane may now be flying faster than necessary to sustain itself safely in the air. However, this is no disadvantage, since the object of a "sustentation indicator" is to indicate when the airplane is flying at the minimum speed to sustain itself safely in the air, and it is usually desirable to fly above this minimum speed. It should, therefore, be obvious that although milli-voltmeter 41 does not give indications which are substantially directly proportional to the square of the velocity of the airplane, yet the milli-voltmeter functions as a "sustentation indicator".

I have described the operation of my invention with cylinder 18 projecting into Venturi tube 10 at or near its throat. The object of using a Venturi tube is to increase the power for vibrating the cylinder above the power available when no tube is employed. Due to the well-known action of a Venturi tube, the velocity of the air inside tube 10 at or near its throat relative to cylinder 18 is higher than the velocity of the airplane relative to the body of air through which it is passing. These two velocities, however, remain substantially directly proportional to each other as long as the throat diameter of the tube is not too much smaller than its inlet diameter. It should, therefore, be obvious that by employing tube 10 I have increased the power available for vibrating cylinder 18 without materially interfering with the accuracy of the indications of milli-voltmeters 36 and 41 as hereinbefore described. If this additional power for vibrating cylinder 18 is unnecessary, then tube 10 may be omitted, in which case it will be necessary to secure magnet 16 to the airplane so that the motion of cylinder 18 is in a plane which is at an angle to the line along which the airplane travels, and preferably this angle should be ninety degrees to obtain the most power for vibrating the cylinder without using a Venturi tube. When this is done the motion of cylinder 18 is in a direction which is represented by the double headed arrow 20, and the line along which the airplane travels is represented by arrows 13 and 14, hence the indications of milli-voltmeters 36 and 41 will be as hereinbefore described.

In Fig. 2, hub 19 is preferably so pivoted in some parts secured to the airplane that the motion of cylinder 18 is in a direction which is represented by arrows 43 and 44 when the line along which the airplane travels is represented by arrow 45. The motion of cylinder 18 will then be in a plane which is perpendicular to the line along which the airplane travels. Magnetic armature 17 secured to hub 19 projects into the space between poles N and S of a permanent magnet 46 which is secured to the airplane in any suitable manner. Magnet 46 is preferably made of cobalt steel, and if desired it may be an electromagnet. A coil 47 surrounds magnet 46, this coil being connected to the leads 24. Compression springs 48 are placed between each side of armature 17 and some part secured to the airplane, as shown, for example, with one of these springs by a collar 49 which is adjustably secured to the airplane in any desired manner. It can be seen that the flux passing between poles N and S tends to pass through armature 17, and that the motion of this armature is in a plane which is substantially directly perpendicular to a line connecting two similar points in the tips of these poles. The position of magnet 46 and the tension of springs 48 are so adjusted that when cylinder 18 is substantially central between the extreme positions it can reach, then the armature is in that position where it provides for the flux of the magnet a path whose reluctance is the lowest it can provide during its movement. In this position of armature 17 the flux passing through coil 47 has the maximum value, whereas movement of the armature to either side of this position decreases the flux passing through the coil. The vibration of cylinder 18 when the airplane is flying, therefore, causes a pulsating uni-directional flux to thread coil 47, thus inducing therein a voltage having the same characteristics as the voltage induced in coil 23 of Fig. 1. It is, therefore, obvious that the indicating apparatus of Fig. 1 may be connected in the manner shown therein to leads 24 in Fig. 2, and the milli-voltmeters 36 and 41 will give indications as described in connection with Fig. 1.

In Fig. 3, the hub 19 and springs 48 are mounted in the manner described in connection with Fig. 2. In Fig. 3, the armature 17 may be of magnetic or non-magnetic material, and it carries two contacts 50 and 51 adapted to co-operate with contacts 52 and 53, respectively. Contacts 52 and 53 are adjustably secured to some part carried by the airplane. A suitable source of direct current, such as a battery 54, is connected across contacts 52 and 53. One of leads 24 is connected in series with a condenser 55 to contact 53 and one of the terminals of battery 54, whereas the other of leads 24 is connected to contacts 50 and 51 by a flexible lead 56. Leads 24 will be connected to the primary winding 26 of transformer 25 shown in Fig. 1. When the airplane is at rest, no contact is made between the contacts carried by armature 17 and contacts 52 and 53. The contacts 52 and 53 are so adjusted that when the airplane is flying through air of the lowest density expected the amplitude of vibration of cylinder 18 is sufficient to cause alternate making and breaking of contact between the contacts carried by armature 17 and contacts 52 and 53. (This is also true of the contacts in Figs. 4 and 5.) When armature 17 is moved to bring contacts 50 against contact 52, the condenser 55 is connected in series with primary winding 26 (Fig. 1) across battery 54, thus charging the condenser with the charging current flowing in one direction through the primary winding. When armature 17 is moved the other way to bring contact 51 against contact 53, the battery 54 is disconnected and the condenser 55 is connected across primary winding 26, thus permitting the condenser to discharge through the primary winding with the direction of the current flow through the latter being opposite to that when the charging current was flowing therethrough. The primary winding 26 is, therefore, traversed by an alternating current whose frequency is equal to the frequency of the vibration of armature 17. It should be obvious that the apparatus shown in Fig. 3 will cause milli-voltmeter 36 (Fig. 1) to give substantially accurate indications of the speed of the airplane relative to the body of air through which it is passing, irrespective of the density of this air.

In Fig. 4, the arrangement is similar to that shown in Fig. 3, except that no condenser is employed and the connections are so made that the making and breaking of connections between the contacts causes a pulsating uni-directional current to flow through primary winding 26 (Fig. 1). The frequency of these pulsations is equal to the frequency of the vibration of armature 17, and, therefore, it should be obvious that the apparatus shown in Fig. 4 will cause milli-voltmeter 36 (Fig. 1) to give substantially accurate indications of the speed of the airplane relative to the body of air through which it is passing, irrespective of the density of this air.

In Fig. 5, the arrangement is similar to that shown in Fig. 3, except that no transformer is employed, one terminal of the condenser 55 being connected to a terminal of battery 54, and the other terminal of the condenser being connected to the contacts on armature 17, and a direct current ammeter 57 is connected in series with the lead that connects contact 53 to the previously mentioned permanent common connection of a terminal of condenser 55 and a terminal of battery 54. When the airplane is flying, the vibration of cylinder 18 causes alternate making and breaking of contact between the contacts on armature 17 and contacts 52 and 53. When armature 17 is moved to bring contact 50 against contact 52, the condenser 55 is connected across battery 54, thus charging the condenser, and when armature 17 is moved the other way to bring contact 51 against contact 53, the battery is disconnected and the condenser is connected across ammeter 57, thus discharging the condenser through the ammeter. The various parts of the circuit are suitably selected so that the condenser will become substantially fully charged and discharged even at the highest expected frequency of vibration of armature 17. The average magnitude of the current flowing through ammeter 57 is substantially directly proportional to the quantity of electricity in coulombs (i. e., ampere seconds) discharged therethrough from condenser 55 per unit of time, and this quantity of electricity per unit of time is substantially directly proportional to the frequency of the vibration of armature 17. It should, therefore, be obvious that if the scale of ammeter 57 is suitably marked in speed units, and if its pointer has sufficient inertia, or the movement thereof is properly dampened, the ammeter will give substantially accurate indications of the speed of the airplane relative to the body of air through which it is passing, irrespective of the density of this air.

Although I have described the operation of the embodiments shown in Figs. 2 to 5, inclusive, without a Venturi tube, it will be obvious that they may also be used with such a tube, as shown for example in Fig. 1.

Since my apparatus gives substantially accurate indications of the speed of the airplane relative to the body of air through which it is passing, irrespective of the density of this air, and since the pilot can be informed by radio of the velocity and direction of movement of the air relative to the ground, it is, therefore, now readily possible for the pilot to determine quite accurately the speed of the airplane relative to the ground.

It will be apparent to those skilled in the art to which this invention relates that any of the modifications herein described for measuring velocity can be used to indicate the volumetric rate of flow of a fluid by arranging the movable element 18 in the manner heretofore described within a pipe, channel, or other passage through which the fluid passes, and by properly calibrating the indicating element.

In accordance with the provisions of the Patent Statutes, I have described the principles of operation of my invention, together with the apparatus which I now consider to represent the best embodiment thereof, but I desire to have it understood that the apparatus shown and described is only illustrative, and that the invention may be carried out by other means.

What I claim as new and desire to secure by Letters Patent of the United States is:

1. A device for measuring the relative velocity between two relatively moving bodies, one of which is a fluid, said device comprising a movable element having a curved surface adapted to be pendulously suspended in the fluid body from the other body so that its curved surface faces the fluid body in the direction in which the moving body travels and so that the motion of the movable element is in a plane which is at an angle to the line along which the moving body travels, said movable element thereby vibrating at a frequency which is substantially directly proportional to the relative velocity between the two bodies, and means operatively associated with said movable element and adapted to be influenced by its frequency of vibration for indicating the relative velocity between the two bodies.

2. A device for measuring the relative velocity between two relatively moving bodies, one of which is a fluid, said device comprising a movable element having a curved surface adapted to be pendulously suspended in the fluid body from the other body so that its curved surface faces the fluid body in the direction in which the moving body travels and so that the motion of the movable element is in a plane which is perpendicular to the line along which the moving body travels, said movable element thereby vibrating at a frequency which is substantially directly proportional to the relative velocity between the two bodies, and means operatively associated with said movable element and adapted to be influenced by its frequency of vibration for indicating the relative velocity between the two bodies.

3. A device for measuring the relative velocity between two relatively moving bodies, one of which is a solid and the other a fluid, said device comprising a movable element having a portion thereof provided with a curved surface adapted to project into the fluid body, said movable element being so pivoted in the solid body that its curved surface faces the fluid body in the direction in which the moving body travels and so that the motion of its curved surface is in a plane which is at an angle to the line along which the moving body travels, said movable element thereby vibrating at a frequency which is substantially directly proportional to the relative velocity between the two bodies, and means operatively associated with said movable element and adapted to be influenced by its frequency of vibration for indicating the relative velocity between the two bodies.

4. A device for measuring the relative velocity between two relatively moving bodies, one of which is a solid and the other a fluid, said device comprising a movable element having a portion thereof provided with a curved surface adapted to project into the fluid body, said movable element being so pivoted in the solid body that its curved surface faces the fluid body in the direction in which the moving body travels and so that the motion of its curved surface is in a plane which is perpendicular to the line along which the moving body travels, said movable element thereby vibrating at a frequency which is substantially directly proportional to the relative velocity between the two bodies, and means operatively associated with said movable element and adapted to be influenced by its frequency of vibration for indicating the relative velocity between the two bodies.

5. A device for measuring the relative velocity between two relatively moving bodies, one of which is a fluid, said device comprising a movable element having a curved surface adapted to be pendulously suspended in the fluid body from the other body so that its curved surface faces the fluid body in the direction in which the moving body travels and so that the motion of the movable element is in a plane which is at an angle to the line along which the moving body travels, said movable element thereby vibrating at a frequency which is substantially directly proportional to the relative velocity between the two bodies, an electrical instrument, and electroresponsive means operatively associated with said movable element and adapted to be influenced by its frequency of vibration for circulating through said instrument a current whose average magnitude is substantially directly proportional to the frequency of the vibration of said movable element.

6. A device for measuring the relative velocity between two relatively moving bodies, one of which is a solid and the other a fluid, said device comprising a movable element having a portion thereof provided with a curved surface adapted to project into the fluid body, said movable element being so pivoted in the solid body that its curved surface faces the fluid body in the direction in which the moving body travels and so that the motion of its curved surface is in a plane which is at an angle to the line along which the moving body travels, said movable element thereby vibrating at a frequency which is substantially directly proportional to the relative velocity between the two bodies, an electrical instrument, and electroresponsive means operatively associated with said movable element and adapted to be influenced by its frequency of vibration for circulating through said instrument a current whose average magnitude is substantially directly proportional to the frequency of the vibration of said movable element.

7. A device for measuring the relative velocity between two relatively moving bodies, one of which is a fluid, said device comprising a movable element having a curved surface adapted to be pendulously suspended in the fluid body from the other body so that its curved surface faces the fluid body in the direction in which the moving body travels and so that the motion of the movable element is in a plane which is at an angle to the line along which the moving body travels, said movable element thereby vibrating at a frequency which is substantially directly proportional to the relative velocity between the two bodies, a magnet having two spaced apart magnetic poles, a movable armature of magnetic material between said magnetic poles, said armature being so mounted that its motion causes a variation in the magnitude of the magnetic flux threading said magnet, means responsive to the motion of said movable element for vibrating said armature at a frequency which is substantially directly proportional to the frequency of the vibration of said movable element, a coil positioned to be inductively threaded by the magnetic flux threading said magnet, an electrical instrument, and means interposed between said coil and said instrument for circulating through the latter a current whose average magnitude is substantially directly proportional to the frequency of the alternating voltage induced in said coil.

8. A device for measuring the relative velocity between two relatively moving bodies, one of which is a solid and the other a fluid, said device comprising a magnet having two spaced apart magnetic poles, a movable element having an arm provided with a curved surface adapted to project into the fluid body and having an armature of magnetic material between said magnetic poles, said movable element being so pivoted in the solid body that its curved surface faces the fluid body in the direction in which the moving body travels and so that the motion of its curved surface is in a plane which is at an angle to the line along which the moving body travels and the motion of its armature causes a variation in the magnitude of the magnetic flux threading said magnet, a coil positioned to be inductively threaded by the magnetic flux threading said magnet, an electrical instrument, and means interposed between said coil and said instrument for circulating through the latter a current whose average magnitude is substantially directly proportional to the frequency of the alternating voltage induced in said coil.

9. A device for measuring the relative velocity between two relatively moving bodies, one of which is a fluid, said device comprising a movable element having a curved surface adapted to be pendulously suspended in the fluid body from the other body so that its curved surface faces the fluid body in the direction in which the moving body travels and so that the motion of the movable element is in a plane which is at an angle to the line along which the moving body travels, said movable element thereby vibrating at a frequency which is substantially directly proportional to the relative velocity between the two bodies, an electrical instrument, electroresponsive means connected to said instrument, said electroresponsive means being adapted to circulate through said instrument a current whose average magnitude is substantially directly proportional to the frequency of energization and subsequent deenergization of the electroresponsive means, and means responsive to the motion of said movable element for effecting the energization and subsequent deenergization of said electroresponsive means at a frequency which is directly proportional to the frequency of the vibration of said movable element.

10. The combination with a source of electric current, of a device for measuring the relative velocity between two relatively moving bodies, one of which is a fluid, said device comprising a movable element having a curved surface adapted to be pendulously suspended in the fluid body from the other body so that its curved surface faces the fluid body in the direction in which the moving body travels and so that the motion of the movable element is in a plane which is at an angle to the line along which the moving body travels, said movable element thereby vibrating at a frequency which is substantially directly proportional to the relative velocity between the two bodies, an electrical instrument, electroresponsive means connected to said instrument, said electroresponsive means being adapted to circulate through said instrument a current whose average magnitude is substantially directly proportional to the frequency at which the electroresponsive means are connected to and disconnected from said source, and means responsive to the motion of said movable element for connecting and disconnecting said electroresponsive means to and from said source at a frequency which is directly proportional to the frequency of the vibration of said movable element.

11. The combination with a source of direct current, of a device for measuring the relative velocity between two relatively moving bodies, one of which is a fluid, said device comprising a movable element having a curved surface adapted to be pendulously suspended in the fluid body from the other body so that its curved surface faces the fluid body in the direction in which the moving body travels and so that the motion of the movable element is in a plane which is at an angle to the line along which the moving body travels, said movable element thereby vibrating at a frequency which is substantially directly proportional to the relative velocity between the two bodies, an electrical instrument, a condenser, a movable contact member having one operating position for connecting said condenser across said source to be charged thereby and having another operating position for connecting said condenser across said instrument to discharge thereinto, and means responsive to the motion of said movable element for moving said movable contact member from one to the other of its operating positions at a frequency which is substantially directly proportional to the frequency of the vibration of said movable element.

12. A device for measuring the relative velocity between two relatively moving bodies, one of which is a fluid, said device comprising a member having a passage for the fluid body, said fluid passage including a portion whose cross-sectional area is smaller than the cross-sectional area of other portions, a movable element having a curved surface pendulously suspended in said fluid passage near its reduced area portion so that its curved surface faces the fluid body in the direction in which the moving body travels and so that the motion of the movable element is in a plane which is at an angle to the line along which the moving body travels, said movable element thereby vibrating at a frequency which is substantially directly proportional to the relative velocity between the two bodies, and means operatively associated with said movable element and adapted to be influenced by its frequency of vibration for indicating the relative velocity between the two bodies.

13. A device for measuring the relative velocity between two relatively moving bodies, one of which is a solid and the other a fluid, said device comprising a member having a Venturi shaped passage for the fluid body, a movable element having one arm provided with a curved surface projecting into said fluid passage near its throat and having a second arm projecting away from said fluid passage, said movable element being so pivoted in the solid body that its curved surface faces the fluid body in the direction in which the moving body travels and so that the motion of its arm projecting into said fluid passage is in a plane which is at an angle to the line along which the moving body travels, said movable element thereby vibrating at a frequency which is substantially directly proportional to the relative velocity between the two bodies, an electrical instrument, and electroresponsive means operatively associated with said second mentioned arm and adapted to be influenced by its frequency of vibration for circulating through said instrument a current whose magnitude is substantially directly proportional to the frequency of the vibration of said movable element.

14. A device for measuring the relative velocity between two relatively moving bodies, one of which is a solid and the other a fluid, said device comprising a magnet having two spaced apart magnetic poles of opposite polarities, a movable element pivoted in said magnet, said movable element having an arm provided with a curved surface adapted to project into the fluid body and an armature of magnetic material between the magnetic poles of said magnet to function as a part of their magnetic circuit, said movable element being so pivoted in said magnet that its curved surface faces the fluid body in the direction in which the moving body travels and so that the motion of its curved surface is in a plane which is at an angle to the line along which the moving body travels and the motion of its armature causes a variation in the magnitude and direction of the magnetic flux threading it, a coil surrounding said armature, an electrical instrument, and means interposed between said coil and said instrument for circulating through the latter a current whose average magnitude is substantially directly proportional to the frequency of the alternating voltage induced in said coil.

15. The combination with a source of electric current, of a device for measuring the relative velocity between two relatively moving bodies, one of which is a solid and the other a fluid, said device comprising a winding, a stationary contact member, a movable element having one arm provided with a curved surface adapted to project into the fluid body and having a second arm carrying a contact member adapted to cooperate with said stationary contact member, said movable element being so pivoted in the solid body that its curved surface faces the fluid body in the direction in which the moving body travels and so that the motion of its curved surface is in a plane which is at an angle to the line along which the moving body travels, connecting means whereby said winding is connected to and disconnected from said source as the contact member carried by the second mentioned arm makes and breaks contact with said stationary contact member, an electrical instrument, and means responsive to the energization and deenergization of said winding for circulating through said instrument a current whose average magnitude is substantially directly proportional to the frequency at which said winding is connected to and disconnected from said source.

16. The combination with a source of direct current, of a device for measuring the relative velocity between two relatively moving bodies, one of which is a solid and the other a fluid, said device comprising a condenser, an electrical instrument, two spaced apart stationary contact members, a movable element having one arm provided with a curved surface adapted to project into the fluid body and a second arm carrying a contact member adapted to make contact with either of said stationary contact members, said movable element being so pivoted in the solid body that its curved surface faces the fluid body in the direction in which the moving body travels and so that the motion of its curved surface is in a plane which is at an angle to the line along which the moving body travels, and connecting means whereby said condenser is connected across said source when the contact member carried by the second mentioned arm makes contact with one of said stationary contact members, and said condenser is connected across said instrument when the contact member carried by the second mentioned arm makes contact with the other of said stationary contact members.

17. A device for measuring the relative velocity between two relatively moving bodies, one of which is a fluid, said device comprising a movable element having a curved surface adapted to be pendulously suspended in the fluid body from the other body so that its curved surface faces the fluid body in the direction in which the moving body travels and so that the motion of the movable element is in a plane which is at an angle to the line along which the moving body travels, said movable element thereby vibrating at a frequency which is substantially directly proportional to the relative velocity between the two bodies and with an amplitude of vibration which varies with changes in the density of the fluid body, and means operatively associated with said movable element and adapted to be influenced by its amplitude and frequency of vibration for giving indications which are responsive to variations of said amplitude of vibration and variations of said frequency of vibration.

18. A device for measuring the relative velocity between two relatively moving bodies, one of which is a fluid, said device comprising a movable element having a curved surface adapted to be pendulously suspended in the fluid body from the other body so that its curved surface faces the fluid body in the direction in which the moving body travels and so that the motion of the movable element is in a plane which is perpendicular to the line along which the moving body travels, said movable element thereby vibrating at a frequency which is substantially directly proportional to the relative velocity between the two bodies and with an amplitude of vibration which varies with changes in the density of the fluid body, and means operatively associated with said movable element and adapted to be influenced by its amplitude and frequency of vibration for giving indications which are responsive to variations of said amplitude of vibration and variations of said frequency of vibration.

19. A flow measuring device comprising a movable member having a curved surface arranged to vibrate freely only in a given plane and adapted to be inserted into a fluid stream so that its curved surface faces the fluid stream in the direction in which the latter moves and so that its plane of vibration is at an angle to the line along which the stream moves, said movable member thereby vibrating at a frequency which is substantially directly proportional to the velocity of the fluid stream, an indicating device, and means operatively associated with said member and adapted to be influenced by its frequency of vibration for actuating said indicating device.

20. In combination, a movable member having a curved surface arranged to vibrate freely only in a given plane and which is adapted to be inserted into a fluid stream so that its curved surface faces the stream in the direction in which the latter moves and so that its plane of vibration is at an angle to the line along which the stream moves, said movable member thereby vibrating at a frequency which is substantially directly proportional to the velocity of the fluid stream, an indicating device, and means operatively associated with said member and adapted to be influenced by its amplitude and frequency of vibration for actuating said indicating device.

WINFIELD B. HEINZ.